Jan. 13, 1931. G. W. McKEE 1,788,925
PROPORTIONAL MIXER CONTROL APPARATUS
Filed May 14, 1925 3 Sheets-Sheet 1
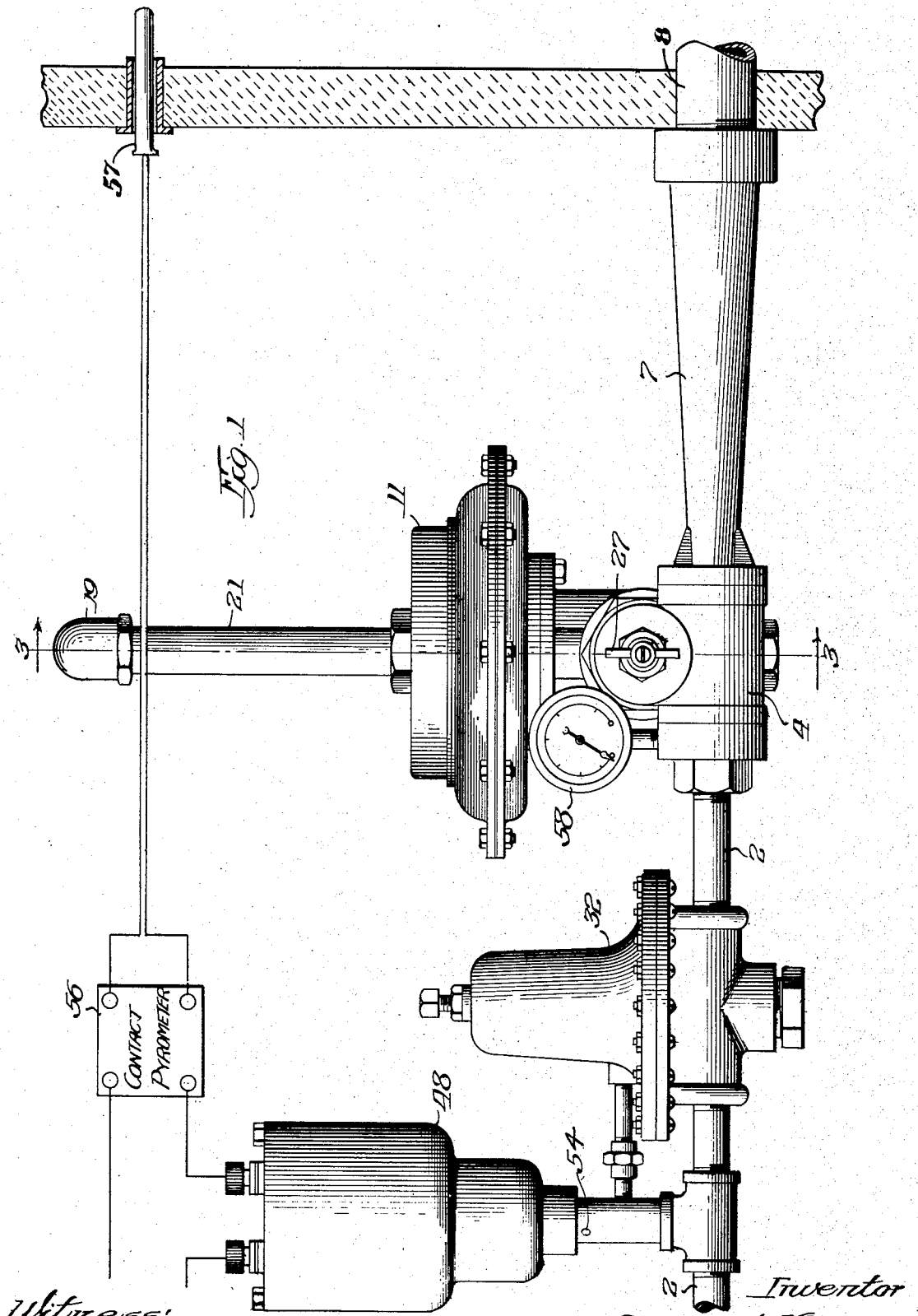

Jan. 13, 1931.　　　　G. W. McKEE　　　　1,788,925
PROPORTIONAL MIXER CONTROL APPARATUS
Filed May 14, 1925　　　3 Sheets-Sheet 2
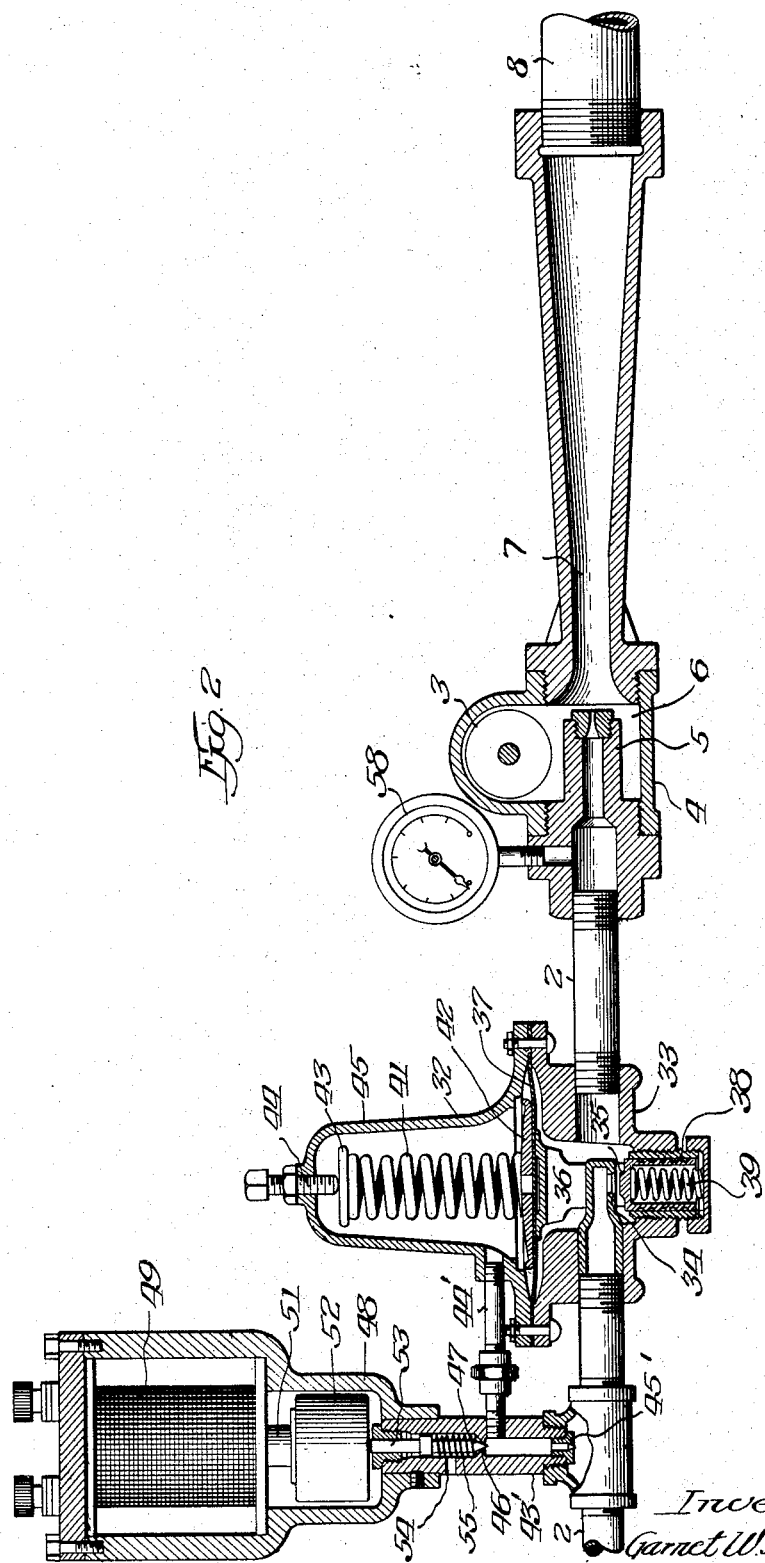

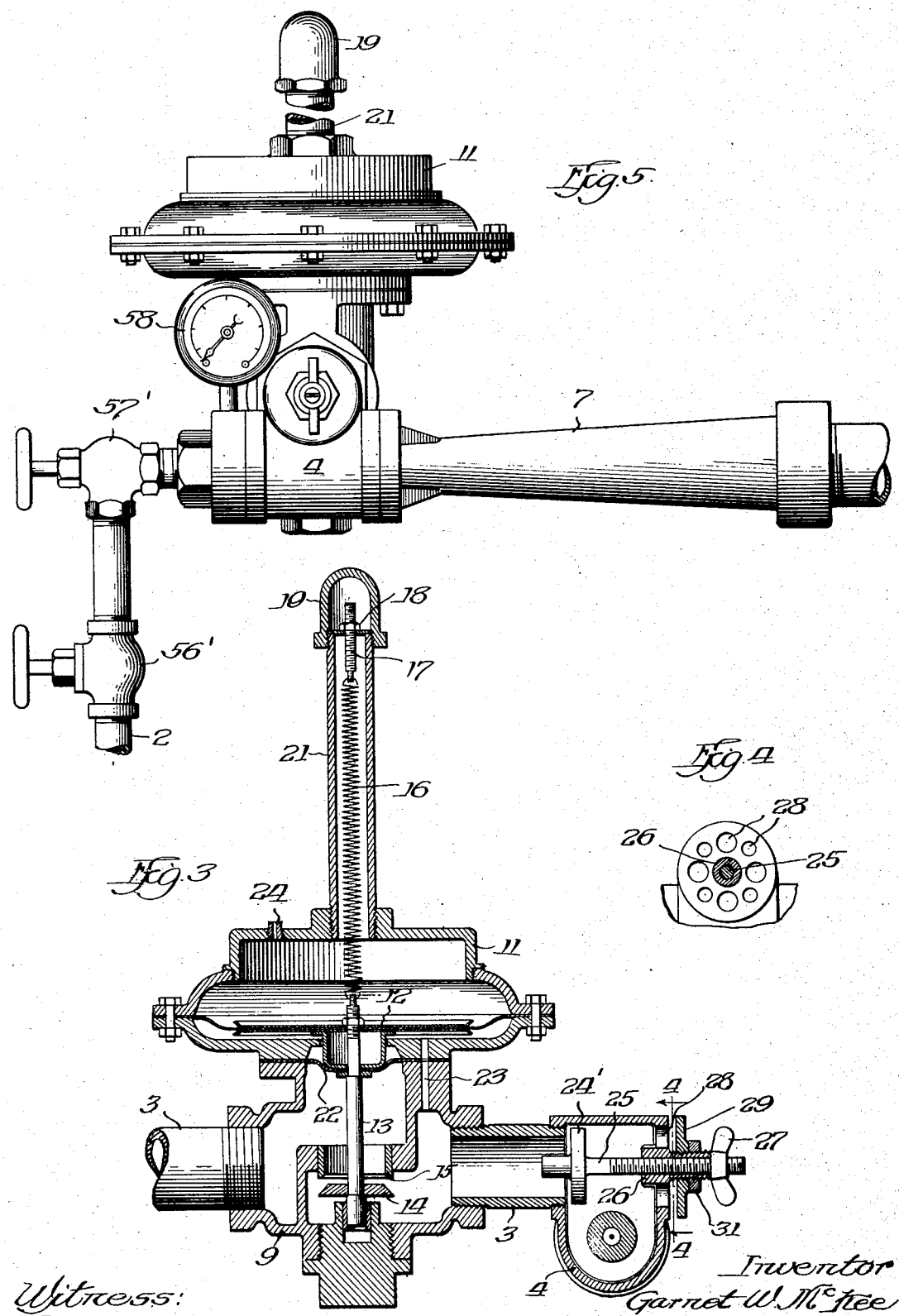

Patented Jan. 13, 1931

1,788,925

UNITED STATES PATENT OFFICE

GARNET W. McKEE, OF ROCKFORD, ILLINOIS

PROPORTIONAL-MIXER-CONTROL APPARATUS

Application filed May 14, 1925. Serial No. 30,223.

This invention pertains generally to proportional mixers and has more particular reference to features of control enabling the proportions of fuel and air in the resulting mixture to be nicely regulated and affording a single control by means of which the flame may be turned up or down and regulated as desired.

One of the primary purposes of this invention is the provision of an apparatus adapted to regulate the size of the flame by controlling only the supply of air under pressure to the mixing device so that regulation of this air supply only will serve to vary the size of the flame as desired without changing the relative proportions of the mixture. The apparatus is therefore capable of operating efficiently not only when a high flame is desired but also with a low or turned down flame and with all intermediate flames.

Another feature of the invention resides in an automatic device adapted to be thermostatically controlled so as to increase or diminish the flame automatically in accordance with the required temperatures in the combustion chamber.

A further object is to provide a novel mixing apparatus for mixing the air and fuel which shall embody simple and effective means for regulating the flow of gas and also the flow of atmospheric air to the mixer so that the requisite proportions of these ingredients will be delivered to produce a mixture adapted for a highly efficient flame.

Other objects and advantages of my invention should be readily appreciated as the same becomes better understood by reference to the following description when considered in connection with the accompanying drawings.

Referring to the drawings:

Fig. 1 is a side elevation of an apparatus embodying my invention;

Fig. 2 is a sectional view taken on the vertical axis of the mixer;

Fig. 3 is a transverse sectional view on the line 3—3 of Fig. 1;

Fig. 4 is a fragmentary view on the line 4—4 of Fig. 3, and

Fig. 5 is an elevation showing the apparatus equipped with a manual instead of an automatic control.

Referring now to the drawings more in detail, reference character 2 indicates a fluid supply pipe which in the present instance is a pipe connected to any suitable source of air under pressure, eighty to one hundred pounds pressure being customary and reference character 3 (Fig. 3) indicates a pipe connected with the fuel supply which in the present instance is a pipe leading from a city gas main. The pipe 2 is connected to one end of a mixer indicated generally by reference character 4 and comprising the nozzle 5 disposed in the mixing chamber 6 and adapted to deliver axially into the expansion tube 7, the delivery end of which is connected with a pipe 8 adapted to deliver the mixture to the point of use such, for instance, as a burner. The fuel supply pipe 3 is connected to the side of the mixer chamber as shown in Figs. 2 and 3 and upon delivery of air under pressure from the nozzle 5, a flow of fuel from the pipe 3 is induced, which is drawn into the expansion tube 7 and thoroughly mixed with the air.

In the fuel supply pipe 3 is interposed a flow regulating device in the form of a zero governor which while it may be of any preferred construction, is illustrated as comprising a valve casing 9 surmounted by a diaphragm casing 11 in which is disposed a flexible diaphragm 12 connected to a valve stem 13 carrying at its lower end a valve 14 adapted to close against a seat 15 formed in the dividing wall of the valve casing. The weight of the valve and stem is carried by a coil tension spring 16 suspended at its upper end from a threaded rod 17 which may be vertically adjusted by the turning of a nut 18 upon the upper end of the rod, the nut being normally covered by a removable cap 19 threaded upon the upper end of a tube 21 projecting from the top of the diaphragm casing. A sealing diaphragm 22 precludes gas pressure delivered by the pipe 3 from entering the diaphragm casing and also serves to balance the valve since the areas of the diaphragm and the valve exposed to the gas pressure are substantially equal. At the delivery side of the valve casing a duct 23 establishes communication with the diaphragm casing beneath the diaphragm 12. The casing above the diaphragm communicates with atmosphere through a port 24. The construction and proportions of this governor are such that the gas is delivered therefrom at atmospheric pressure, since if any appreciable pressure exists in the delivery side of the valve casing this pressure transmitted through the duct 23 against the lower face of the diaphragm 12 raises this diaphragm thereby partially or wholly closing the valve 14 to reduce or entirely shut off the flow of gas.

The flow of gas from the governor to the mixing chamber of the mixer 4 may be further regulated by a disc 24′ (Fig. 3) opposed to the delivery end of the pipe 3 and carried by a stem 25 which is threaded into a supporting boss 26 formed in the outer side wall of the mixer 4. This disc 24′ may be adjusted toward or from the end of the pipe 3 so as to diminish or increase the effective discharge area from this pipe by means of a screw driver or other implement engaged in the outer projecting end of the stem 25. A locking device in the form of a wing nut 27 threaded upon the stem against the outer end of the boss 26 serves to lock the disc in adjusted position.

Atmospheric air is admitted to the mixing chamber through the ports 28 formed in the side wall of the chamber around the boss 26 as best shown in Fig. 4, and the flow of air through these ports into the mixing chamber is regulated by adjustment of a disc 29 threaded onto the outwardly projecting portion of the boss 26 and adapted to be adjusted toward or from the ports 28 to vary the air flow thereto. A lock nut 31 threaded onto the boss serves to hold the disc 29 in adjusted position. It will be apparent therefore that by adjusting the stem 25 within the boss 26, the flow of gas to the mixer may be regulated and by adjusting the disc 29 upon the boss, the flow of atmospheric air into the mixer may be regulated. Manipulation of these two adjustments therefore will serve to give the requisite proportions of air and gas in the resulting mixture delivered from the expansion tube 7.

In the air supply line 2 there is interposed an air controlling or turn down valve indicated generally by reference character 32 which comprises a valve casing 33 provided with a valve seat 34 adapted to be closed by valve 35 carried by a yoke 36 which is connected with a flexible diaphragm 37. The valve is carried upon a plunger 38 and is normally urged toward its seat by an expansion spring 39. A second expansion spring 41 interposed between plate 42 on the upper face of the diaphragm 37 and an abutment 43, the position of which may be adjusted by an adjusting screw 44 threaded through the cap 45 opposes the action of the spring 39, and the pressure under which the valve will open to a predetermined degree may be regulated by adjustment of the spring 41.

For controlling the action of the valve 35 I have connected into the air pipe 2 a branch consisting of the leg 43′ and a connecting pipe 44′ so that communication between the pipe 2 and the chamber above the diaphragm 37 is established. When the full pressure from the pipe 2 is admitted to the chamber above the diaphragm, the diaphragm will be depressed against action of the spring by the combined action of the air pressure and the spring 41 thus opening the valve 35 to the maximum so as to deliver the maximum of air to the mixing device and, by the injector action in the mixer, gas from the pipe 3 and the atmospheric air through the ports 28 will be drawn in to produce a resultant mixture of the requisite richness and of the quantities to produce at the burner the maximum desirable flame. The flow of air from pipe 2 to the valve chamber is restricted by a perforated plug 45′ interposed in the leg 43′.

When it is desired to turn down the flame, the pressure in the valve chamber above the diaphragm 37 is reduced the requisite amount by permitting a portion of the air to escape from the leg 43′ to atmosphere. This may be accomplished by a hand operated relief valve or by any other suitable mechanism, and in Figs. 1 and 2 I have shown an automatic thermostatically controlled apparatus for accomplishing this result. Referring to Fig. 2 it will be observed that the bore through the leg 43′ is provided with a seat 46 adapted to be closed or partially closed by a needle valve 47, the stem of which projects upwardly into a casing 48, housing a solenoid 49 and core 51, which is provided at its lower end with a weight 52 adapted to rest upon the upper end of the stem 53 of the valve and hold it in the closed position shown in Fig. 2. A spring 55 surrounding the stem opens the valve as the weight 52 is lifted. A port 54 permits the escape to atmosphere of air pressure from within the leg 43′ when the valve 47 is wholly or partially opened. The solenoid 49 is energized by the closing of an electrical circuit including a contact pyrometer 56 equipped with a thermo couple 57 adapted to be disposed in the combustion chamber of the furnace or other apparatus with which my invention is used. When a predetermined maximum temperature is attained in the combustion chamber, the circuit is closed to energize the solenoid 49, thereby lifting the weight 52 and permitting the valve 47 to open so as to relieve or partially relieve the pressure above the diaphragm 37, thereby permitting the valve 35 to approach its seat under the action of spring 39 so as to reduce the flow of compressed air to the mixer to a point which will produce a desirable turn down flame at the burner. The size of this flame may be regulated by manipulation of the adjusting screw 44 to adjust the tension on the spring 41. When the temperature in the combustion chamber falls to the predetermined minimum for which the pyrometer is set, the circuit will be broken, the weight 52 will fall, closing the valve 47, thus reestablishing the pressure in the valve chamber above the diaphragm 37 so as to open the valve 35 to its maximum and thereby produce the maximum flame range in the combustion chamber. During the ranges of flame between maximum and minimum, the mixture delivered to the burner will be in the requisite proportions because the partial vacuum produced in the mixing chamber by the delivery of compressed air from the nozzle 5 will vary in proportion to the flow of compressed air from this nozzle, and since the gas is always under atmospheric pressure and the auxiliary air is always under atmospheric pressure, the flow will be dependent upon the volume of compressed air being delivered to the mixer and the resultant mixture will consequently always be of the requisite predetermined portions determined by regulation of the discs 24' and 29.

In Fig. 5 I have shown a modified form of my invention in which the flow of air under pressure to the mixer 4 is manually controlled. In this instance, in the air supply line 2 there is interposed a shutoff valve 56' by which the flow of air may be entirely shut off and a control valve 57' by which the maximum flow may be regulated. In order to determine the pressure of the air being delivered to the mixer, I preferably equip the air line between the control valve of the mixer with a pressure gauge 58 as shown.

It will be apparent from the foregoing that I have provided a control apparatus by which the size of the burner flame may be controlled from a single control device interposed in the compressed air line, and the manipulation of this device will vary the size of the flame without varying the proportion of the constituents of the mixture. This device may be automatically controlled from the temperature in the combustion chamber or in any element heated thereby so that the desired temperature will be automatically maintained. The details of construction as shown and described may obviously be varied within wide limits without departing from the essence of my invention as defined in the following claims.

I claim:

1. In an apparatus of the character described, the combination of a mixer, means for admitting gas and atmospheric air in regulated quantities to said mixer, an air pressure line connected with the mixer, a pressure control valve provided with a control chamber interposed in said line, a connection between said line and the control chamber of said valve, a port through which pressure in said chamber may be relieved to atmosphere, a valve controlling the relief of pressure through said port, and thermostatically actuated means for regulating said last mentioned valve.

2. In an apparatus of the character described, the combination of a mixing chamber provided at one side with a gas supply port and at the other side with an air admission port, a boss carried by one wall of said chamber, a disc adjustably carried by said boss for regulating the flow of gas to the chamber, an adjustable disc carried by said boss for regulating the flow of air to said chamber, and means for delivering air under pressure to said chamber.

3. In an apparatus of the character described, the combination of a mixer, means for admitting gas thereto, an air pressure line connected with the mixer, a pressure controlled valve interposed in said line, a connection between said line and the control chamber of said valve, a port through which pressure in said chamber may be relieved to the atmosphere, a valve controlling the relief of pressure through said port, and means for regulating said last mentioned valve for controlling the first valve.

4. In an apparatus of the character described, the combination of a mixing device, separate means for delivering air at atmospheric pressure, gas at a constant pressure, and air under pressure greater than atmospheric pressure to said device, a single control valve in the high pressure air line for varying a characteristic of the flow of all said gaseous fluids to the device without varying their relative proportions, and means for regulating the flow of each gaseous fluid relatively to the others.

5. In an apparatus of the character described, the combination of a mixing device, separate means for delivering air substantially at atmospheric pressure, gas at a constant pressure, and air under a pressure greater than atmospheric pressure to said device, a pressure actuated valve in the high pressure air line for regulating the quantities of gaseous mixtures delivered from said mixing device without varying the relative proportions of the mixture and means controlled by temperatures produced by the burning mixture for varying the actuating pressure on said valve.

6. In an apparatus of the character described, a mixer adapted to supply mixed fuel to a combustion chamber, means including a zero governor for delivering fuel gas to the mixer at substantially atmospheric pressure, means for delivering air to the mixer at substantially atmospheric pressure, means for delivering air at greater than atmospheric pressure to said mixer, and a pressure actuated valve thermostatically controlled by the combustion chamber temperatures for regulating the delivery of high pressure air to vary the quantity of the mixture without varying its proportions.

7. In a fuel supply apparatus, a mixer for delivering a combustible mixture to a furnace, means for supplying air at atmospheric pressure to the mixer, regulatable means for supplying gas at a constant pressure to the mixer, means for regulating the relative proportions of said gas and said air, means for supplying compressed air to the mixer for inspirating into the mixer the gas and atmospheric pressure air, and pressure actuated means thermostatically controlled by temperatures produced in the furnace by the mixture for regulating the supply of compressed air to the mixer.

8. In a fuel supply apparatus, a gas supply line having a pressure actuated valve for maintaining a constant pressure in the gas supplied by the line, a mixer for delivering a combustible mixture to a furnace, means for admitting air at atmospheric pressure to the mixer, means for regulating the relative proportions of said gas and air admitted to the mixer, a high pressure air supply line adapted to deliver air into the mixer to entrain upon itself a stream of the aforesaid gas and air in unchanging relative proportions, and thermostatic means controlled by the temperature in the furnace for regulating the amount of high pressure air delivered to the mixer.

9. In a fuel supply apparatus, a gas supply line having a pressure actuated valve for maintaining a constant pressure in the gas supplied by the line, a mixture for delivering a combustible mixture to a furnace, means for admitting air at atmospheric pressure to the mixer, means for regulating the relative proportions of said gas and air admitted to the mixer, a high pressure air supply line adapted to deliver air into the mixer to entrain upon itself a stream of the aforesaid gas and air in unchanging relative proportions, a diaphragm actuated valve in said high pressure air line, and thermostatically operated means controlled by the temperature in the furnace for regulating said valve by directing various fractional portions of the high pressure in said high pressure air line upon said diaphragm with valve regulating effect.

10. In a fuel supply apparatus, a gas supply line having a pressure actuated valve for maintaining a constant pressure in the gas supplied by the line, a mixer for delivering a combustible mixture to a furnace, means for admitting air at atmospheric pressure to the mixer, means for regulating the relative proportions of said gas and air admitted to the mixer, a high pressure air supply line adapted to deliver air into the mixer to entrain upon itself a stream of the mixer to entrain upon itself a stream of the aforesaid gas and air in unchanging relative proportions, and thermostatic means controlled by the temperature in the furnace for regulating the amount of high pressure air delivered to the mixer, said pressure actuated gas valve having means for adapting it to be shut off by the supply of gas flowing to it whenever the high pressure air supply ceases.

In witness of the foregoing I affix my signature.

GARNET W. McKEE.